United States Patent

[11] 3,614,755

[72] Inventor Joseph W. Hart
Phoenixville, Pa.
[21] Appl. No. 796,087
[22] Filed Feb. 3, 1969
[45] Patented Oct. 19, 1971
[73] Assignee Burroughs Corporation
Detroit, Mich.

[54] ASSOCIATIVE THIN FILM MEMORY ORGANIZATION
10 Claims, 11 Drawing Figs.

[52] U.S. Cl. .......... 340/174 GA, 340/146.2, 340/174 TF, 340/174 M, 340/174 PC, 340/174 WA
[51] Int. Cl. .......... G11c 15/00, G11c 11/14
[50] Field of Search .......... 340/174, 146.2; 235/177

[56] References Cited

UNITED STATES PATENTS 3,456,246 7/1969 Chow .......... 340/174
3,222,645 12/1965 Davis .......... 340/146.2

*Primary Examiner*—James W. Moffitt
*Attorney*—Carl Fissell, Jr.

ABSTRACT: This disclosure relates to an associative memory organization of an array of thin film storage elements for the storing of bits and the complement bits corresponding thereto. Upon the presentation of a code word to the code word register, a ZERO residing in the significant bit level of the code word will cause the interrogation of a particular significant bit level in the memory array while the presence of a ONE in the code word will cause the interrogation of the corresponding complement bit level. In this manner, a match between the contents of a particular word location in the memory and the code word will result in the interrogation of only those memory elements which reside in a ZERO state in the matching word location. The disclosure also describes a manner of orienting the individual thin film storage elements to minimize the signal induced on the respective sense lines upon interrogation of that memory element when it resides in a ZERO state. The effect of the memory organization and storage element orientation is to allow a larger number of bits to be sensed for a matching word by reducing the accumulation of ZERO bit signals generated on the word level sense line which accumulations might otherwise cancel out a ONE bit signal that indicates a mismatch.

INVENTOR.
JOSEPH W. HART

BY [signature]

ATTORNEY

INVENTOR.
JOSEPH W. HART
BY
[signature]
ATTORNEY

INVENTOR.
JOSEPH W. HART
BY [signature]
ATTORNEY

INVENTOR.
JOSEPH W. HART
BY
ATTORNEY

ASSOCIATIVE THIN FILM MEMORY ORGANIZATION

BACKGROUND OF THE INVENTION

This invention relates to an associative thin film memory, and more particularly, to the organization of an associative thin film memory containing a relatively large number of thin film spots or bit locations.

There are various types of memories that have been disclosed in the computer art under such various terms as associative memories, search memories, tag memories and catalog memories. Basically, all these memories have a common feature that can be best described by saying that these memories are content addressable or data addressable. When a test word or code word is presented to the memory, the contents of the memory are searched to determine if there is a match with the code word. The memory location address of the matching contents is indicated so that matching word and other data associated with that word may be read out of the memory. Such memories may be employed for various purposes such as storing microprograms, which purposes are nevertheless of a special nature and it is often desirable to have such memories compatible with the cycle time of the processing unit as distinct from main memories and even bulk store memories which might be considered to be peripheral to an associated processing unit. For this reason, where practical, the associative memory is preferably adapted to employ thin magnetic films which are characterized by higher switching rates, among other things, than are magnetic cores. However, thin film memories have low signal-to-noise ratios and therefore are limited to the number of bits that can be accommodated in the given word by the word sense line since the unwanted signals associated with the switching of each of the thin film bits is accumulative on an individual sense line. In an associative memory the accumulation of ZERO signals could be sufficient to cancel a significant ONE signal.

A particular requirement of associative memories is that they possess nondestructive readout characteristics. Thin film memories are particularly adaptable to this in that they may be readily formed with uniaxial anisotropy or a preferred (easy) axis of magnetization. Magnetic films for nondestructive data stores are disclosed in the Hart U.S. Pat. No. 3,320,597, which is assigned to the assignee of the present application and which disclosure is incorporated herein by reference. Earlier disclosures of thin films for nondestructive memories were of a type-requiring film pairs wherein a bit to be stored was employed to switch one of the members of the pair to one or the other of its remanent states and the other member of the pair is oriented with its preferred axis set at a right angle to the corresponding preferred axis of the first member of the pair such that readout from the second member does not destroy the information stored in the first member. This type of storage element required that the organization and wiring of the memory array be adapted to the characteristics of this type of nondestructive store element. However, the memory element disclosed in the above U.S. Pat. No. 3,320,597 does not require the use of pairs of elements and is of the type contemplated for employment with the present invention.

It is an object of the present invention to provide an improved thin film associative memory.

It is another object of the present invention to provide an improved organization for an associative memory employing thin magnetic films.

It is still another object of the present invention to provide an improved thin film array for associative memories wherein the accumulation of unwanted signals coupled to the sense line during readout is minimized.

SUMMARY OF INVENTION

The above-described objects of the present invention are accomplished by two features, both of which are designed to minimize the coupling of unwanted signals to the respective sense lines of a memory array of an associative memory. One of these features is the arrangement of the array such that the relevant sense lines will receive readout from only those memory locations which reside in a remanent state corresponding to a ZERO bit. Another feature resides in the orientation of the individual thin film spots relative to sense windings to minimize flux changes in the thin film spot during ZERO readout.

Associative memories differ from other nondestructive readout memories primarily in that, in other nondestructive readout memories, the interrogation of the given word location is such that all the individual bit locations of that word are interrogated and read out on separate individual sense lines. In an associative memory, however, there is a single sense line associated with every word location and the interrogation of each of the bits is such that if a match occurs between the test word and a word at a given location, all of the bit locations of the word matching the test word are to exhibit little or no flux change and produce a ZERO readout on the sense line for that word. Thus, a match between the test word and the word at a particular word location produces a ZERO readout while all mismatches will produce a ONE readout.

Specifically, the present invention is adapted to employ nondestructive readout storage elements of the type described in the above-referred to Hart patent wherein the writing of data into the storage element is achieved by the application of both transverse and longitudinal fields while the nondestructive readout therefrom is achieved by application of a transverse field alone. In this situation, the effect of an applied transverse field of a given magnitude is the same irrespective of the polarity of the applied transverse field and thus, in the present invention, the transverse interrogating or read pulses are all of the same polarity. In order to satisfy the requirements of associative memory that the readout of a word location containing a word which matches the code or test word is of minimum amplitude, the present invention employs a sufficient number of bit locations to accommodate the storage of the particular bit and the complement thereof for each bit in the word. The array organization is such that when a given bit is written into appropriate location, its complement is also written into an adjacent bit location. When readout is required, a ZERO in the test word will activate an interrogation of the true bit while a ONE in the test word will activate the interrogation of the complement bit. Thus, when a match is achieved with the test word, the accumulation of signals sensed by the sense line of that word will be of sufficient minimum value to be distinguishable from a readout of ONE.

In the nondestructive readout storage element of the above-described Hart patent, the signals produced upon readout as the magnetic moment rotates and returns back, will be either a negative-going pulse followed by a positive-going pulse or else a positive-going pulse followed by a negative-going pulse, depending upon the remanent state of the film spot being interrogated. For the purpose of adapting such a device to an associative memory, it is required that the pulses produced on the sense line from the interrogation of the ZERO bit be of a minimal value. To this end, a feature of the present invention resides in the orientation of the film spot such that its anisotropic axis or axis of easy direction of magnetization is at a slight angle with respect to the longitudinal field. This orientation reduces the signal output of the film upon interrogation when the film is in one remanent state and increases the signal output from the film upon interrogation of the film when it is in its other remanent state. It is this feature which allows a plurality of bit locations to be sensed on a single sense line and be interrogated simultaneously to produce a ZERO or minimal signal output as required in associative memories. The greatest reduction of the zero output has been found to be obtained for a skew or orientation of approximately 2°. However, it has been observed that the same effect exists to a lesser degree when the skew is of an angle of only 1.5° or even when the skew is as much as an angle of 3°.

DESCRIPTION OF THE DRAWINGS

The above and other objects, advantages and features will become more readily apparent from the following specification when taken in conjunction with the drawings wherein.

DETAILED DESCRIPTION OF MEMORY ARRAY

Figure 1:
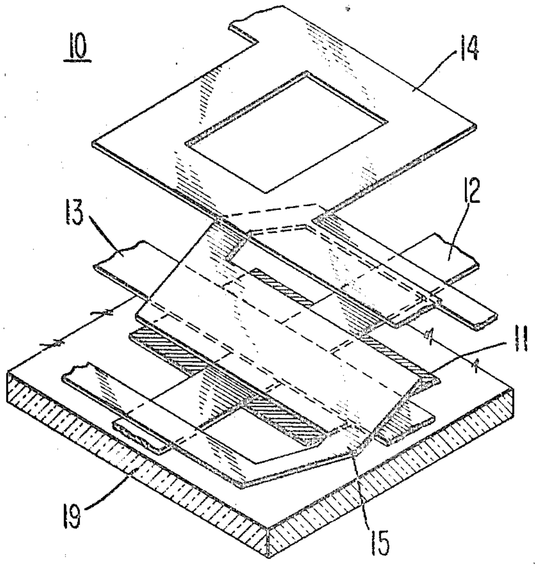
FIG. 1 is a partially exploded pictorial view illustrating an individual memory unit in relation to the various windings associated therewith as employed in the present invention.

As illustrated in FIG. 1, an individual memory unit 10 comprises a thin film layer 11 and various drive and sense windings associated therewith. These windings include sense winding 12, which is arranged approximately perpendicular with the easy direction of magnetization of thin film 11, interrogate drive line 13 which is arranged perpendicularly (at right angles) to sense line 12 and is approximately parallel to the easy direction of magnetization of thin film 11, longitudinal drive line 14 which crosses over thin film 11 parallel to sense line 12, and transverse drive line 15 which crosses over thin film 11 parallel to interrogate drive line 13. The above description of the orientation of the respective drive lines with respect to the easy direction of magnetization of thin film 11 have been described as approximate since a particular feature of the the present invention resides in the skewing of the easy direction of magnetization with respect to the respective drive lines through an angle of approximately 2°, as will be more thoroughly described below. Thus, the interrogate drive line 13 and transverse drive line 15 will be parallel to one another and perpendicular to sense line 12 and longitudinal line 14 as these respective lines pass over thin film 11; however, the orientation of interrogate drive line 13 with respect to the easy axis of magnetization of thin film 11 is approximately 2°. This skew of approximately 2° is illustrated diagrammatically in FIGS. 3, 4 and 5. FIG. 1 has been presented merely to illustrate the physical relationships between thin film 11 and the various drive and sense lines whose respective functions are described in relation to FIGS. 3, 4 and 5.

Thin film 11 is adapted to operate in a nondestructive mode wherein, as described in the above-referred to Hart patent, the magnetic moment may be caused to rotate under the influence of an applied magnetizing field which is transverse to the axis of anisotropy or easy axis of magnetization. Upon removal of the transverse magnetic field, the magnetic moment will rotate back provided that the applied transverse field did not exceed the anisotropy field. If the applied transverse field is greater than the anisotropy field, and a longitudinal field is also applied, then the latter field will determine the state of the magnetic moment after the longitudinal field is removed.

The organization of the transverse and longitudinal current conductors which established the respective transverse and longitudinal magnetic fields will now be described in relation to FIGS. 3, 4 and 5. In each of these figures, there is shown an array of 12 magnetic elements or units each of which is of the type described in relation to FIG. 1. These 12 units are arranged in an array of three rows of four bits each wherein each row represents a word location. Counting from the left side of the figures, the first and third columns represent significant bits of each of the word locations while the second and fourth columns represent the corresponding complement bits thereof.

Figure 3:
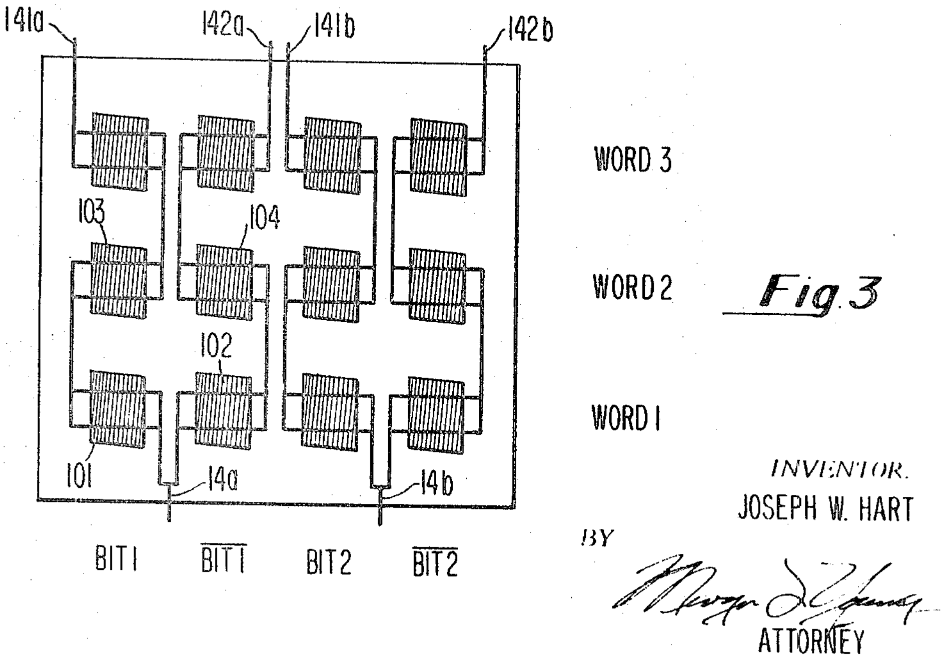
FIG. 3 is a schematic diagram illustrating the arrangement of the longitudinal drive lines employed in the present invention.

FIG. 3 best illustrates the relationship between the respective bits in each of the word locations and the corresponding complement bits. As illustrated therein, memory units 101 and 103 represent a significant bit location in word locations 1 and 2 respectively, while memory units 102 and 104 represent the corresponding complement bit locations. When it is desired to write into a particular memory unit such as unit 101, a longitudinal magnetic field is applied by the longitudinal drive currents supplied by conductor 141*a* as illustrated in FIG. 3, together with a transverse magnetic field which is applied by a transverse current supplied by conductor 151 as illustrated in FIG. 4. It will be noted in FIG. 3 that when a longitudinal drive current is applied to memory unit 101 by conductor 141*a* in one direction, the same current is applied in the opposite direction to memory unit 102 by conductor 142*a* because of the symmetry of the two conductors about the longitudinal axis.

In order to simultaneously supply longitudinal drive currents of opposite directions to memory units 101 and 102, conductor 14*a* is extended into the memory plane between respective unit locations and it is provided with segments 141*a* and 142*a* which diverge therefrom across the respective memory units 101 and 102. The respective conductors 141*a* and 142*a* are then extended across the memory plane from the word location represented by memory units 101 and 102 to the word location of the next higher order, in this case, word location 2 represented by memory units 103 and 104. The respective conductors 141*a* and 142*a* then converge toward one another across the respective memory units 103 and 104 and then are further extended across the memory plane to the corresponding memory unit locations of the next higher order word location and so on. In this manner, a current pulse is supplied in one direction to memory unit 101, and the current pulse of the opposite direction will simultaneously be supplied to memory unit 102. It will be noted that although memory unit 103 is of the same significant bit order as memory unit 101, a current pulse traversing memory unit 101 in one direction will traverse memory unit 103 in the opposite direction. In order that the respective signals induced on the various sense lines all have the same significance, it is necessary that the logic circuitry associated with the memory provide the same current direction to each of the memory units of a given significant bit level at the time when a word is being written into the particular word location in which the respective memory unit resides. For example, if a ZERO bit is to be written into memory unit 101, a current pulse of a given direction will be supplied by conductor 141*a* across memory unit 101 at that time. If a ZERO bit is to be written into memory unit 103 at a different time, conductor 141*a* will supply a current across memory unit 103 in the same direction although, at this particular time, that current pulse will traverse memory unit 101 in the opposite direction.

Conductor 14*a* is adapted to supply the longitudinal currents required to apply longitudinal magnetic fields to memory units of a particular significant bit level in each of the various word locations of the memory array and also to the memory units of the complement bit level associated therewith. Similarly, conductor 14*b* is adapted to supply the longitudinal drive currents to the memory units representing the different significant bit level in each of the various word locations.

In addition to the longitudinal magnetic field, a transverse magnetic field is also employed to write into the various memory units of the type employed in the present invention.

Figure 4:
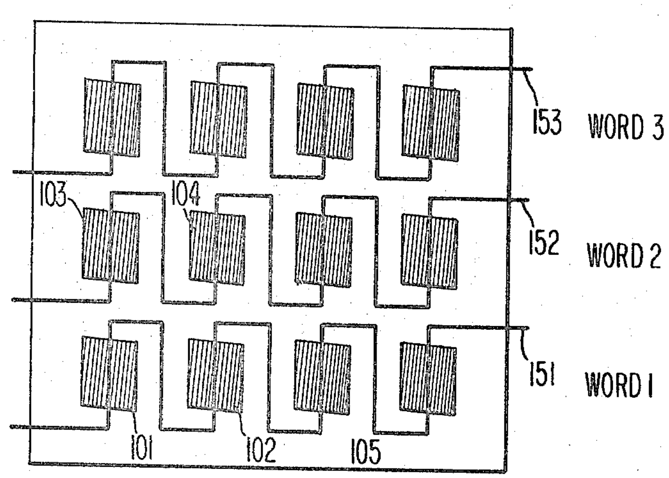
FIG. 4 is a schematic diagram illustrating the arrangement of the transverse drive lines employed in the present invention.

FIG. 4 illustrates the arrangement of the transverse drive lines 151, 152 and 153 associated with the respective word locations 1, 2 and 3. Thus, while the longitudinal drive lines are associated with individual significant bit levels, the transverse drive lines are associated with respective word levels. As illustrated in FIG. 4, the individual transverse drive lines are extended into the memory plane between the memory units of different word levels and then traverse a particular memory unit in a direction approximately parallel to the easy axis of magnetization of that particular memory unit. The term "approximate" is employed in accordance with the description of the magnetic unit of the present invention as has been discussed above. It will be noted from FIG. 4 that each of the respective transverse drive lines associated with the various word levels always traverse the individual memory units of the particular word level in the same direction so as to supply a drive current having the same direction for each of the memory units at a time when the bits of a particular word are being written into that word level. As will be more thoroughly described below in the discussion of the various signal waveforms, the currents supplied by transverse drive conductors will always be in the same direction.

FIGS. 3 and 4 illustrate the various drive lines required for a write operation in the memory array of the present invention. As distinct therefrom, FIG. 5 illustrates the arrangement of the interrogate drive lines and the sense lines employed during a read operation of the memory array of the present invention. As illustrated in FIG. 5, the respective interrogate drive lines are individually associated with the memory units of a particular significant bit level in each of the word locations and the complement bit levels corresponding to each of these significant bit levels. Thus, interrogate drive line 131*a* extends across the memory plane in a manner so as to traverse memory unit 101 and 103 while interrogate drive line 132*a* extends across the memory plane to traverse memory units 102 and 104, memory units 101 and 103 representing the particular significant bit level of word locations 1 and 2 and memory units 102 and 104 representing the corresponding complement bits thereof. Interrogate drive lines 131*b* and 132*b* have similar relations to other memory units illustrated in FIG. 5.

The respective sense lines 121, 122 and 123 are each associated with the various memory units and each of the word locations for a word 1, 2 and 3.

Figure 5:
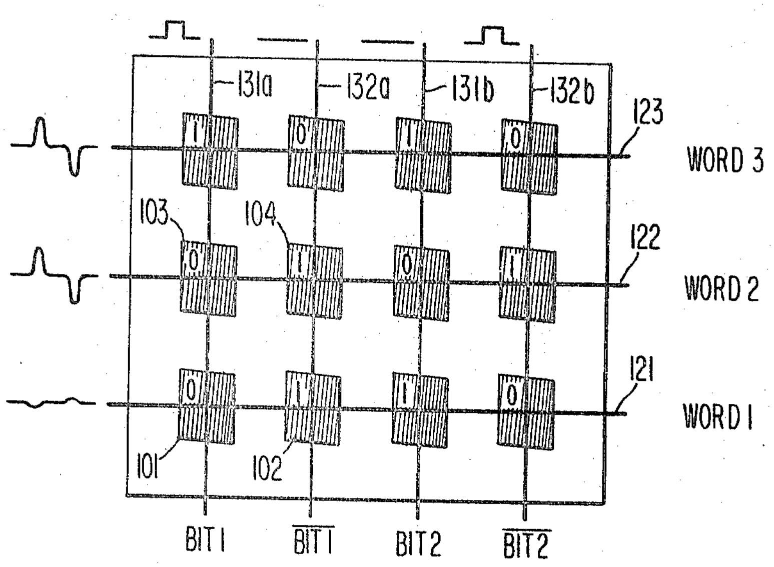
FIG. 5 is a schematic diagram of the arrangement of the interrogation drive lines and sense lines of the memory array employed in the invention.
Figure 6:
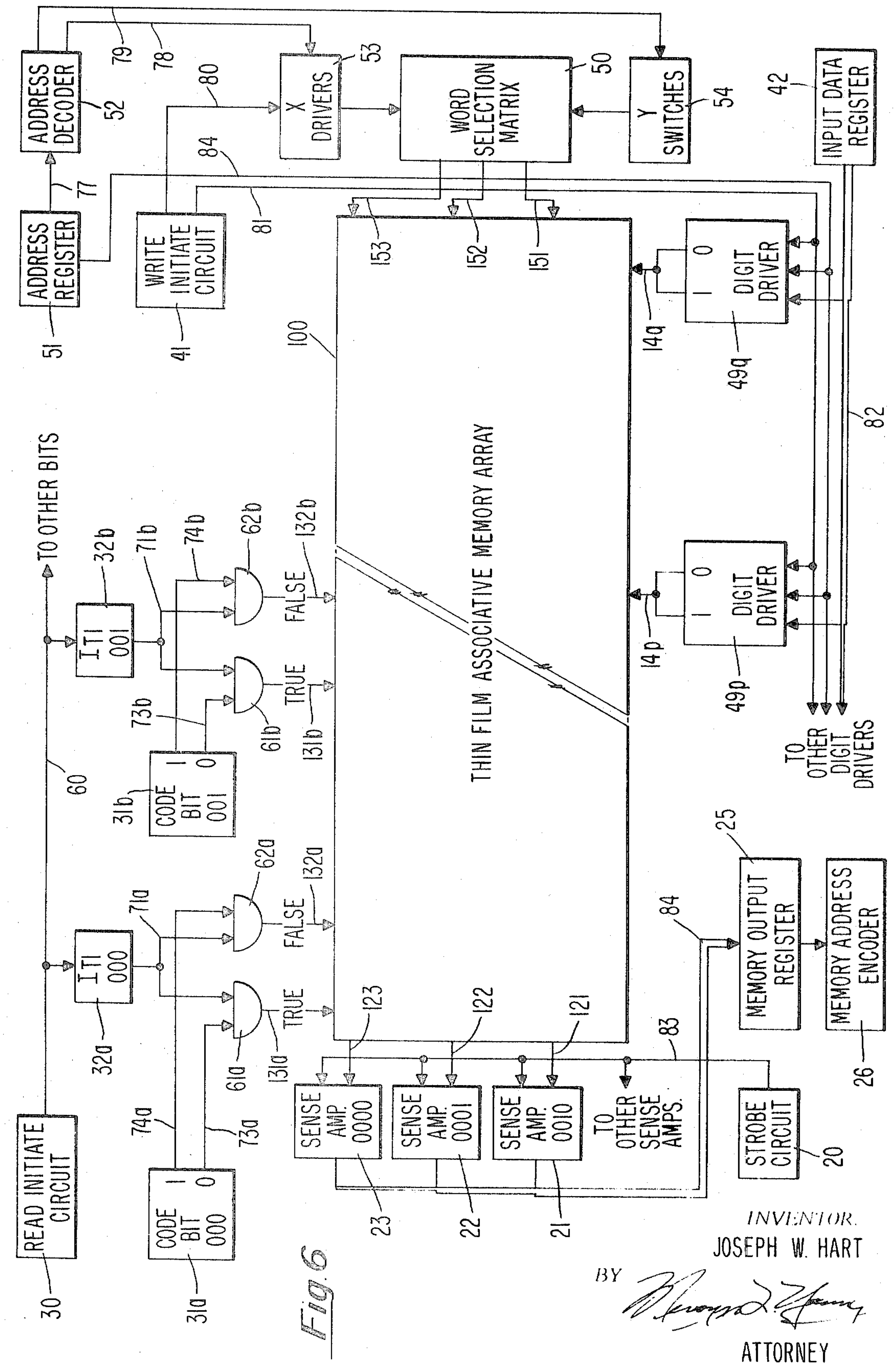
FIG. 6 is a schematic diagram of the read and write drive circuitry associated with the memory array.

Although it is not specifically indicated in FIG. 5, the characteristic of memory units 102 and 104 as being for the storage of the bits which are complementary to bits stored in memory units 101 and 103, is a relationship which is physically defined by the circuitry of the system in the same way that this relationship is defined by the respective pairs of conductors 141*a* and 142*a* as well as conductors 141*b* and 142*b* in FIG. 3. This relationship is illustrated in FIG. 6 which is a schematic diagram of the associative memory system and wherein the respective interrogate drive lines are coupled to the code word register by way of dual drive circuitry for each bit location in the code word register such that if a specific significant bit level contains a ZERO, the interrogate drive line for that significant bit level is supplied with a current pulse; however, if a particular significant bit level in the code word register contains a ONE, then the interrogate drive line associated with the complement of that specific bit level is supplied with a driving pulse.

Figure 2:
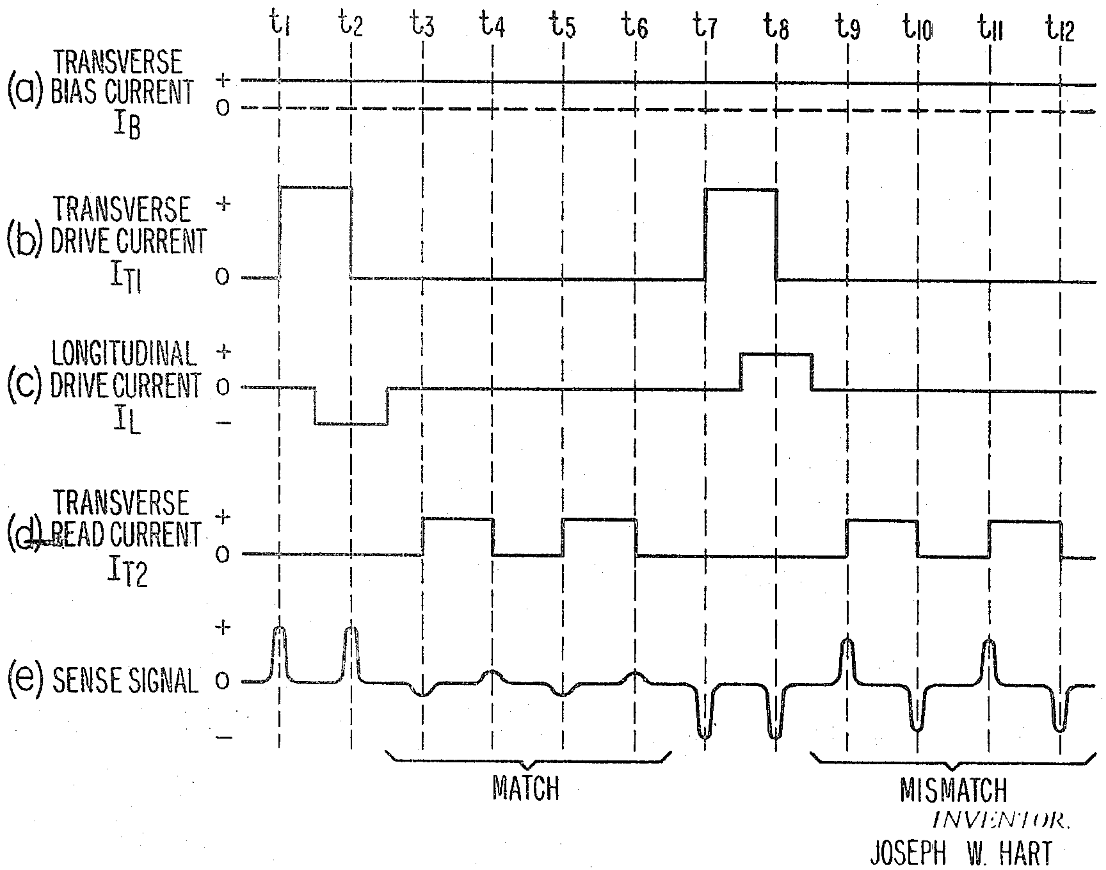
FIG. 2 is a set of waveforms illustrating the timing relationship between the writing, interrogating and sense line signals as employed in the present invention.
Figure 7:
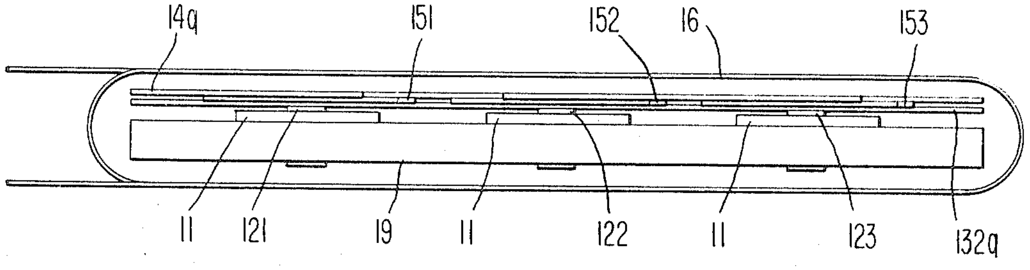
FIG. 7 is an elevational view of the memory plane and illustrates the transverse bias windings related thereto.

As illustrated in FIG. 2, and discussed in reference thereto, a constant transverse magnetic field is applied to all of the memory units of the array, which field is generated by a transverse bias current applied to a solenoidal winding wrapped around the memory array in a longitudinal direction. The purpose of this transverse bias magnetic field is discussed in the above-referred to Hart U.S. Pat. No. 3,320,597, and is primarily to cause the rotation of the anisotropic axis of the thin film to increase the amplitude of the sense signals. The manner in which such a bias field is applied to the thin films is illustrated in FIG. 7 which is an elevational view of the memory array. As shown therein, a plurality of thin films 11 are mounted on a substrate 19. Respective sense lines 121, 122 and 123 and the respective horizontal and transverse drive lines as discussed in reference to FIgS. 3, 4 and 5 are placed adjacent to the thin films 10 to provide magnetic coupling therewith. As illustrated in FIG. 7, transverse bias conductor 16 is then extended around the memory array to enclose the array a plurality of times, the number of turns of the solenoid being sufficient to provide for an even distribution of the transverse bias magnetic field of appropriate magnitude.

It will be understood that the transverse bias field provides certain conveniences to the accommodation of the thin film for nondestructive readout and that this bias field is not required for the nondestructive readout mode of operation of the thin film. Thus, the embodiment shown in FIG. 7 may be considered to merely be an alternative embodiment of the present invention.

Figure 9:
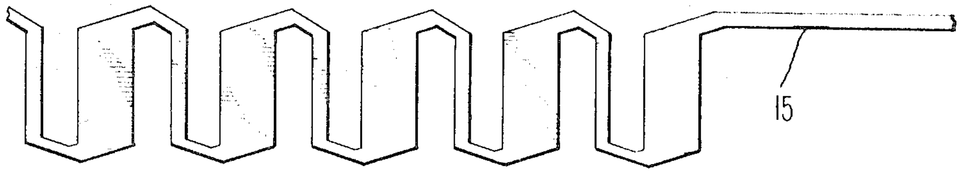
FIG. 9 is a plan view of the transverse drive windings employed in the present invention.
Figure 8:
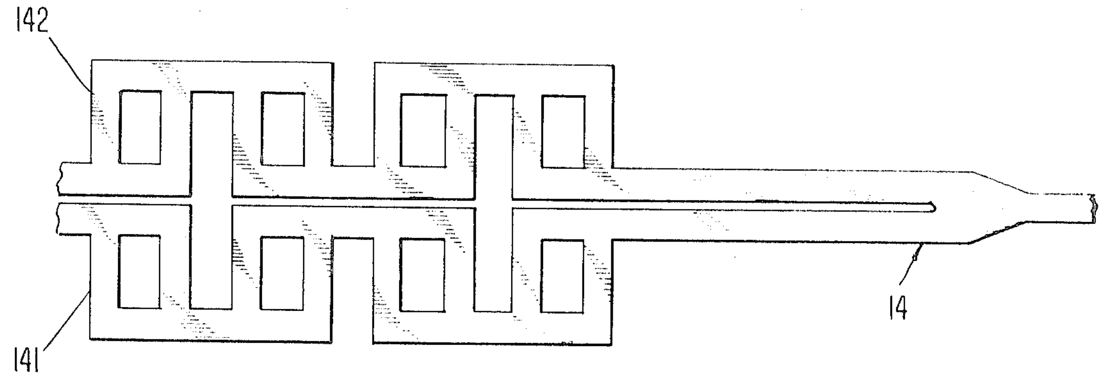
FIG. 8 is a plan view of the longitudinal drive windings employed with the present invention.

The particular configuration of the longitudinal and transverse drive lines according to the present invention are illustrated in FIGS. 8 and 9 respectively. A detailed discussion of these configurations will not be presented here. However, the manner in which transverse drive line 15 is adapted to provide a transverse magnetic field of enhanced uniformity and the manner in which longitudinal drive line 15 is adapted to minimize coupling with other drive lines and sense lines will become more readily apparent from a review of FIGS. 8 and 9.

OPERATION OF THE MEMORY ARRAY

The memory system of FIG. 6 includes a plane or a three-dimensional array of memory units of the type employed in the present invention as well as the selection circuitry for writing into the memory, the sense amplifiers and memory output registers and the code word register employed to initiate the read operation. As shown in FIG. 6, memory array 100 is formed of a plurality of memory units of the type described in reference to FIGS. 3, 4 and 5. For the purpose of this description, memory array 100 has been chosen ARRAY 96 memory elements arranged in three word levels of 16 significant bits and the complement bits thereof. The respective significant bit levels have been designated *a*,...,*q* where the letter "*o*" is not employed to avoid confusion with the numeral "O."

When it is desired to write into a word location of memory array 100, the word address is presented to the address register 51, the contents of which are decoded by address decoder 52. The output signals from address decoder 52 condition the X drivers 53 and set the Y switches 54 to select a particular one of the transverse drive lines 151, 152 or 153, in accordance with the contents of address register 51. During the write portion of the read-write cycle of the memory array, write initiate circuit 41 activates the conditioned X drivers 53 to provide the appropriate current pulse to the selected one of the transverse drive lines. At the same time, write initiate circuit 41 activates the respective digit drivers 49*a*,...49*q* to provide the appropriate longitudinal drive currents to the respective memory units of the array as was described in reference to FIG. 3, the state of the respective digit drivers being determined by the contents of input date register 42. As was pointed out in reference to FIG. 3, the longitudinal drive currents must be of an opposite polarity when the word location being written into has an even address. To this end, as shown in FIG. 6, the contents of the least significant bit of address register 51 is employed to transmit a true or false signal by way of conductor 84 to condition the respective digit drivers 49*a*, . . . 49*q* to provide the appropriate positive or negative signals according to the word location under selection during the write operation.

During the read operation, the test word or code word for which the memory is to be searched is supplied to the code word register which is made up of a plurality of code bit latches 31*a*,...31*q*. As has been described in reference to FIg. 5, one or the other of the respective interrogate drive lines 131 or 132 will be activated but not both. Thus, as illustrated in FIG. 6, the contents of code bit latch 31*a* will be employed to condition either AND-gate 61*a* or AND-gate 62*a* but not both so that when interrogate driver 32*a* is activated by a signal from read initiate circuit 30, an interrogate drive current will be supplied either by conductor 131*a* or 132*a* but not both. In this manner, the read operation will interrogate either a significant bit level or the complement bit level corresponding thereto depending upon the contents of code bit latch that services that level.

In response to the various interrogate drive currents, the appropriate sense signals will be induced on the respective sense lines 121, 122 and 123 associated with the respective word levels 1, 2 and 3. The corresponding sense amplifiers 21, 22 and 23 which receive the respective sense signals are activated at strobe time by strobe circuit 20 to provide output signals to set memory output register 25. The signals thus received, will set the memory output register 25 to either contain all ONES or else to contain all ONES except for one significant bit which will be a ZERO. The former case indicates that the code word does not match any of the code words in the memory array while the latter situation indicates that there has been a match with the code word and the significant bit level in which a ZERO resides indicates the word location address of the matching word. This latter condition is then sensed and encoded by memory address encoder 26 which generates the appropriate address from which other data associated with the matching word in the memory is to be read out. (Under certain conditions the memory array may be adapted for employment where there will be more than one match with the code word. In this situation, additional circuitry must be provided to determine the priority in which the various matching word locations are to be read out of the memory array.)

Perhaps a better understanding of the memory operation will be received from a review of FIG. 2 which illustrates the various waveforms of the currents associated with the memory array of FIG. 6. The waveforms illustrated in FIG. 2 are of significance in relation to the single memory unit or thin film spot, it being understood that the transverse drive current of waveform (*b*) and the sense signal of waveform (*e*) appear on conductors that are associated with individual word levels while the longitudinal drive current of waveform (*c*) and the transverse read current of waveform (*d*) are found on conductors associated with individual significant bit levels.

As indicated in FIG. 2, a constant transverse bias current is supplied to a solenoid winding encompassing the entire memory plane to establish a constant transverse bias magnetic field. The solenoid winding has not yet been described and will be described below. During a write operation, the respective transverse and longitudinal magnetic fields required to write into a particular memory unit are established by the transverse drive current as indicated in waveform (*b*) and a longitudinal drive current as indicated in waveform (*c*). It will be observed from waveforms (*b*) and (*c*) that the transverse drive current is always positive when employed while the longitudinal drive current may be either positive or negative and it is the polarity of the longitudinal drive current and the resultant polarity of the longitudinal magnetic field that determines the remanent state in which the memory unit will reside.

During the read operation, it is the transverse read current waveform (*d*) that is employed to interrogate the individual memory units. It will be observed from waveform (*e*) that the signal is generated on the sense line whenever there is a change in a transverse field. Thus, at time $t_1$, a large pulse will be generated on the sense line due to the application of the transverse drive currents as indicated in waveform (*b*) and, similarly, a large pulse is generated on the sense line at time $t_2$ when the transverse drive current is terminated. The second pulse is indicated as negative going since the remanent state of the memory unit was changed by the application of a longitudinal drive current as indicated in waveform (*c*) to write a ZERO into the memory unit. During readout at time $t_3$, a transverse read current supplied to this memory unit will generate a very small set of pulses on the sense line to indicate the ZERO state of the memory unit. In accordance with the present invention this ZERO pulse will indicate a match between the contents of the code bit latch doing the interrogating and the state of the memory unit being interrogated. If at time $t_8$ a ONE is written into the memory unit by the application of a positive-going longitudinal drive current indicated in waveform (*c*), then at all subsequent times, the application of transverse read current will result in signals of sufficient magnitude to represent a ONE being generated on the sense line. This latter condition indicates a mismatch between the code bit latch and the data stored in the memory unit.

That a match between the data stored in the memory unit and the code bit latch results in a ZERO signal while a mismatch between the data stored in the memory unit and the code bit will produce a ONE signal will be understood when it is remembered that, with the organization of the present invention, when a ONE is written into a particular memory unit, then a ZERO is written into the corresponding memory unit representing the complement thereof, and, when a ZERO appears in a particular significant code bit, the true interrogate drive windings are activated while if a ONE appears in that the code bit, the complementary interrogate drive line is activated.

DESCRIPTION OF THE STORAGE ELEMENT ET

Figure 10A:
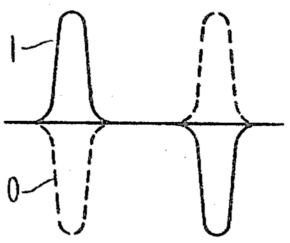
FIGS. 10*a* and 10*b* are waveforms illustrating a feature of the present invention.
Figure 10B:
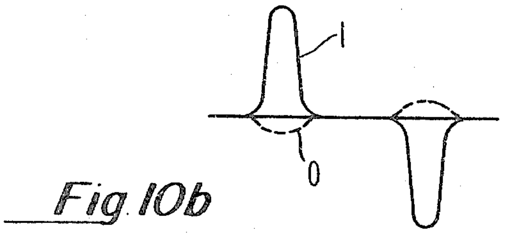

It will be understood that with the storage element of the present invention, the application of the transverse magnetic field for a nondestructive readout will cause first a negative-going pulse followed by a positive-going pulse when the memory unit resides in one remanent state which will be designated the ZERO state and that application of the transverse field for nondestructive readout will result in a positive-going pulse followed by a negative-going pulse when the magnetic memory unit of the present invention is in its other remanent state which will be designated as the ONE state. The manner in which the ZERO pulse readout is reduced and the ONE pulse readout is enhanced in the present invention will now be described in reference to FIGS. 10*a*and 10*b*. FIG. 10*a* is a representation of the signals induced on the sense line when the memory unit of the present invention has its anisotropic axis or axis of easy direction of magnetization residing in an almost perfect perpendicular manner with the sense line. It will be observed from FIG. 10 *a* that two signals can be generated when a transverse field is applied for nondestructive readout. The signal representing a ONE written into the memory is a positive-going pulse followed by a negative-going pulse. On the other hand, the ZERO signal is first a negative-going pulse followed by a positive-going pulse. This implies that at least during the nondestructive readout mode of operation, domains exist with magnetic moments in both the positive and the negative state which are equally effected by the application of a transverse field. However, when the anisotropic axis of the film has been rotated 2° with respect to the interrogate drive line which produces the transverse magnetic field, the signals generated on the sense line are as illustrated in FIG. 10*b* and where, because of the nonlinear nature of the applied field, the film shows a preference for the positive state. While an orientation of 2° is optimum, similar results are obtained for a range of orientation of 1.5°–3°.

CONCLUSION

As thus described, an improved associative memory array organization is provided by the present invention whereby a match between the contents of a word location of the memory and a code word result in only those memory units being read out which reside in a ZERO remanent state and wherein individual memory units are characterized by providing a reduced signal indicative of ZERO remanent state and an enhanced signal representing a ONE remanent state.

It will be appreciated that alternative embodiments of the present invention may be employed. For example, although the present invention contemplates the employment of a particular type of memory element, the organization of the present invention may be employed with other types of memory elements such as film pairs. Thus, while one embodiment of the present invention has been described in detail, modifications and changes will be apparent to those skilled in the art, which modifications and changes will nevertheless remain within the scope of the invention as claimed.

What is claimed is:

1. An associative memory device adapted to receive code information and to generate a relatively large signal indicative of a mismatch between the code information and information contained in the memory and to generate a relatively minimal signal when a match occurs, said device comprising:

a sense line;

a pair of storage elements for each significant bit location, each element having two remanent states, each of said element being coupled to said sense line in a manner such that, upon interrogation, each element will cause to be produced on said sense line a relatively minimal signal when in one of its remanent states and a relatively large signal when in the other of its remanent states;

first circuit means coupled to each of said storage elements and adapted to simultaneously urge one of said storage elements into one remanent state and the other of said storage elements into the opposite remanent state; and second circuit means coupled to each of said storage elements and adapted to interrogate a particular one (or the other) of said storage elements in accordance with said code information.

2. An associative memory device according to claim 1 wherein each of said storage elements is formed of a film of magnetic material having an anisotropic axis.

3. An associative memory device according to claim 2 wherein:

said first circuit means includes means to provide both longitudinal and transverse magnetic fields in coupling relationship with each of said storage elements relative to the anisotropic axis of each of said films; and said second circuit means is adapted to provide a transverse magnetic field to one or the other of said storage elements relative to the anisotropic axis thereof.

4. An associative memory device according to claim 3 wherein said respective storage elements have their anistropic axes orientated to generate a minimal signal on said sense line when said element resides in a particular one of said remanent states.

5. An associative memory device according to claim 3 wherein each of said storage elements is oriented with its anisotropic axis at an angle with respect to said longitudinal magnetic field of approximately 3°.

6. An associative memory device according to claim 3 wherein each of said storage elements is oriented with its anisotropic axis at an angle with respect to said longitudinal field which angle is in the range from 1.5° to 3°.

7. An associative memory device according to claim 1 wherein said second circuit means includes a pair of interrogate conductors each of which is coupled to one of said storage elements.

8. An associative memory device according to claim 7 including a pair of code bit gates, each coupled to one of said interrogate conductors and adapted to apply a signal to said conductor in accordance with said code information.

9. An associative memory device according to claim 1 including additional pairs of said storage elements coupled to said sense line.

10. An associative memory device according to claim 1 including additional pairs of said storage elements coupled to said second circuit means.